United States Patent [19]

Akamatsu

[11] Patent Number: 5,064,027
[45] Date of Patent: Nov. 12, 1991

[54] BRAKE SHOE FOR BICYCLES

[75] Inventor: Shogo Akamatsu, Izumi-shi, Osaki, Japan

[73] Assignee: Maeda Industries, Ltd., Osaka, Japan

[21] Appl. No.: 601,318

[22] Filed: Oct. 23, 1990

[30] Foreign Application Priority Data

Oct. 23, 1989 [JP] Japan ............................ 1-124358[U]

[51] Int. Cl.⁵ .............................................. F16D 65/00
[52] U.S. Cl. .................... 188/73.1; 188/24.12; 188/24.19; 188/250 G; 188/250 B
[58] Field of Search ............... 188/73.1, 24.11–24.22, 188/250 R, 250 B, 250 G, 250 E, 244

[56] References Cited

U.S. PATENT DOCUMENTS

| 3,305,048 | 2/1967 | Brilando | 188/24.12 |
| 3,776,333 | 12/1973 | Mathauser | 188/24.19 X |
| 3,840,093 | 10/1974 | Hamayasu | 188/73.1 X |
| 3,868,002 | 2/1975 | Babled | 188/250 B X |
| 4,029,181 | 6/1977 | Lewis | 188/24.12 X |
| 4,230,208 | 10/1980 | Gale | 188/24.12 X |
| 4,901,824 | 2/1990 | Nagano | 188/250 G X |

FOREIGN PATENT DOCUMENTS

| 0375567 | 6/1990 | European Pat. Off. | 188/24.12 |
| 294547 | 2/1954 | Italy | 188/73.1 |
| 0112426 | 8/1980 | Japan | 188/73.1 |
| 0126123 | 7/1984 | Japan | 188/24.11 |
| 60-30854 | 7/1985 | Japan . | |
| 62-1873 | 1/1987 | Japan . | |
| 0141323 | 6/1987 | Japan | 188/73.1 |
| 0102933 | 4/1990 | Japan | 188/73.1 |
| 428468 | 7/1967 | Switzerland | 188/24.12 |
| 2146717 | 4/1985 | United Kingdom | 188/24.11 |

Primary Examiner—Douglas C. Butler
Attorney, Agent, or Firm—William H. Eilberg

[57] ABSTRACT

A brake shoe for bicycles having a shoe holder provided with a connecting rod on its back, and a shoe block held at its base portion to the shoe holder. The braking face of the shoe block is formed with a projection serving as a gauge for positioning the braking face at an appropriate angle with the rim surface of the wheel. When the brake shoe is to be attached to a brake arm, the brake shoe is so positioned that two points of the shoe block, i.e., one point of the braking face and the projection, are in contact with the rim surface, and the brake shoe in this state is fixed to the brake arm. The brake shoe thus positioned is operable optimally as contemplated by the designer. When the brake is actuated, the projection is readily collapsed without producing any adverse effect on the braking function and removed early by friction.

5 Claims, 3 Drawing Sheets

BRAKE SHOE FOR BICYCLES

BACKGROUND OF THE INVENTION

1. Field of the Invention

The present invention relates to brake shoes for bicycles, and more particularly to a brake shoe to be attached to the forward end of the brake arm of the bicycle.

2. Description of the Prior Art

Like the so-called caliper brake disclosed, for example, in Examined Japanese Patent Publication SHO 60-30854 and the so-called cantilever brake disclosed in Examined Japanese Patent Publication SHO 62-1813, brakes for bicycles generally comprise a pair of brake arms pivoted to the frame of the bicycle, and brake shoes attached to the forward ends of the respective brake arms and movable into pressing contact with the respective side surfaces of the wheel rim to exert a braking force thereon.

With reference to FIGS. 7 to 9, the brake shoe to be attached to the brake arm end comprises a shoe holder 3 having a connecting rod 2 on its back, and a rubber shoe block 4 fittingly held at its base portion by the shoe holder. The connecting rod 2 is attached to the unillustrated brake arm.

With the bicycle brake of the type mentioned, it is not suitable to attach the brake shoe 1 to the brake arm so that the braking face 4a will be in parallel to the rim 5 of a wheel as shown in FIG. 7, but it is favorable to attach the brake shoe as so inclined that the distance l1 between the front end of the braking face 4a and the rim 5 is smaller than the distance l2 between the rear end of the braking face 4a and the rim 5 as seen in FIG. 9. (The term "front" as used herein refers to the direction P of advance of the wheel rim 5 in rotation, and the term "rear" to the opposite direction.)

The reason is as follows.

When the brake shoe 1 attached to the brake arm as shown in FIG. 7 is pressed against the rim 5 in rotation, the frictional force exerted by the rim 5 on the braking face 4a in the direction of arrow P deflectively deforms the brake arm or the frame to which the arm is attached, shifting the brake shoe 1 to the phantom line position shown in FIG. 8. The braking face 4a of the shoe block 4 then will not be uniformly pressed against the rim 5 but the rear portion of the face 4a will be concentrically pressed against the rim 5 as seen in FIG. 8, possibly permitting the front portion of the braking face 4a to be out of contact with the rim 5.

Consequently, the braking face 4a of the shoe block 4 not only fails to apply an effective braking force on the rim 5 but is also likely to permit its rear portion to contact the rim 5 with poor stability and chatter, resulting in a markedly diminished braking force.

Accordingly, it is desired that the brake shoe 1 be attached, as positioned as shown in FIG. 9, to the brake arm, with allowance made for the deflection of the brake arm due to the frictional force to be exerted thereon by the rim on braking. When the brake shoe 1 installed in place is so positioned as shown in FIG. 9, the braking face 4a of the shoe block 4 becomes pressed against the rim 5 uniformly over the entire length of the face upon the application of the brake as the result of the deflection of the brake arm due to the frictional force applied by the rim. This enables the braking face to exert an effective braking force on the rim free of chatter.

For the reason given above, many of the brake shoe mounts of bicycle brakes are recently adapted to adjust the angle of inclination of the shoe block braking face 4a with respect to the rim 5.

Nevertheless, it is impossible for the user to accurately determine the inclination to be given to the braking face 4a relative to rim 5. Moreover, even if the proper angle of inclination is known, unskilled users will encounter difficulty in actually adjusting the braking face 4a to the preferred angle with respect to the rim.

Furthermore, the optimum inclination of the braking face 4a differs variously with the material of the shoe block, the coefficient of friction of the braking face 4a on the rim, or the estimated amount of deflection of the brake arm to be caused by the braking action. However, it is not always certain that the user will adjust the braking face to the desired inclination contemplated by the designer.

SUMMARY OF THE INVENTION

Accordingly, an object of the present invention is to provide a brake shoe for bicycles which is so adapted that the angle of the braking face of the shoe block with respect to the rim surface can be very easily adjusted by the user to the optimum angle contemplated by the designer.

To fulfill the above object, the present invention provides a brake shoe for bicycles which is attachable to the brake arm of the bicycle for braking the wheel thereof when pressed against the surface of the wheel rim, the brake shoe comprising:

- a shoe holder,
- a shoe block held at its base portion to the shoe holder and having a braking face adapted for surface-to-surface contact with the rim, and
- a connecting rod provided on the back of the shoe holder for connecting the shoe holder to a caliper arm, the braking face of the shoe block being formed with a projection.

According to the preferred embodiment, the projection is formed integrally with the rubber forming the shoe block and is positioned on the braking face at a portion thereof rearward with respect to the direction of rotation of the rim, and the shoe holder or the shoe block is provided with a mark indicating the direction of rotation of the rim.

When two points of the shoe block, i.e., one point of the braking face and the tip of the projection, are brought into contact with the rim surface, the braking face is positioned as inclined with respect to the rim surface in corresponding relation with the height of the projection. The angle of this inclination is the desired angle of inclination contemplated by the designer of the brake. The brake shoe is fixed to the brake arm with threaded means by positioning the brake shoe in place first in the manner described above and eventually tightening up the threaded means with the shoe thus positioned.

In this way, the angle of inclination of the braking face with respect to the rim surface can be readily adjusted by any person to the optimum angle designed.

The projection is not expected to bear a force but serves merely as a gauge for determining the angle of inclination of the braking face with respect to the rim surface when the brake shoe is to be attached to the brake arm. Accordingly, the strength of the projection is not a matter of importance; it is rather favorable for the projection to have such low strength as to be collapsible by the application of the brake since the projection will then produce no adverse effect on the contemplated braking function of the brake shoe. The shoe block having the projection is usually made of rubber, so that the projection is removed by the frictional contact thereof with the rim surface while the brake is repeatedly actuated. Thus, when the brake shoe of the invention is attached to the brake arm, the projection appears on the braking face but is automatically removed early after serving as the gauge, whereby the brake shoe is made to have the same appearance and function as usual brake shoes.

Other objects, features and advantages of the present invention will become more apparent from the following detailed description with reference to the accompanying drawings.

DETAILED DESCRIPTION

Figure 1:
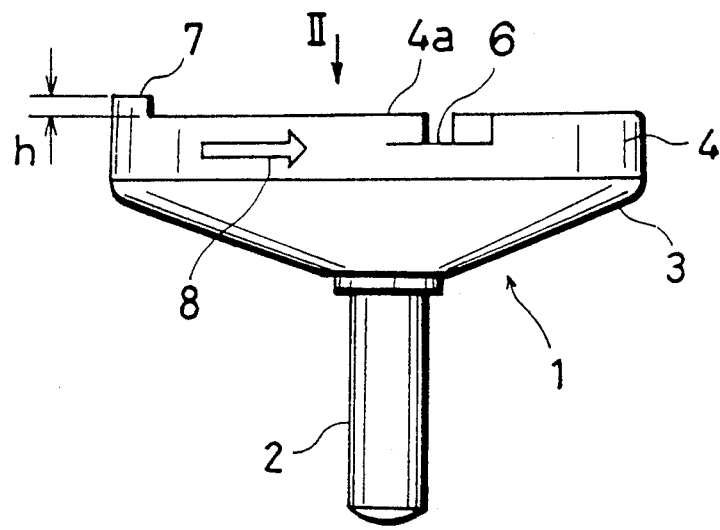
FIG. 1 is a plan view of a bicycle brake shoe embodying the invention.

Preferred embodiments of the present invention will be described below in detail with reference to FIGS. 1 to 6. Throughout FIGS. 1 to 9, like parts are designated by like reference numerals.

Figure 2:
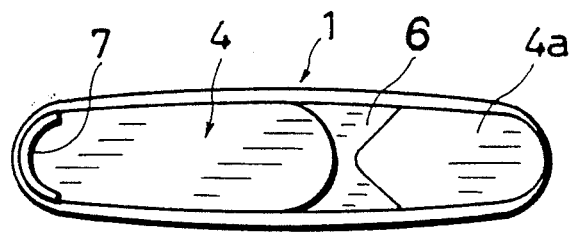
FIG. 2 is a view of the brake shoe as it is seen in the direction of arrow II in FIG. 1.
Figure 3:
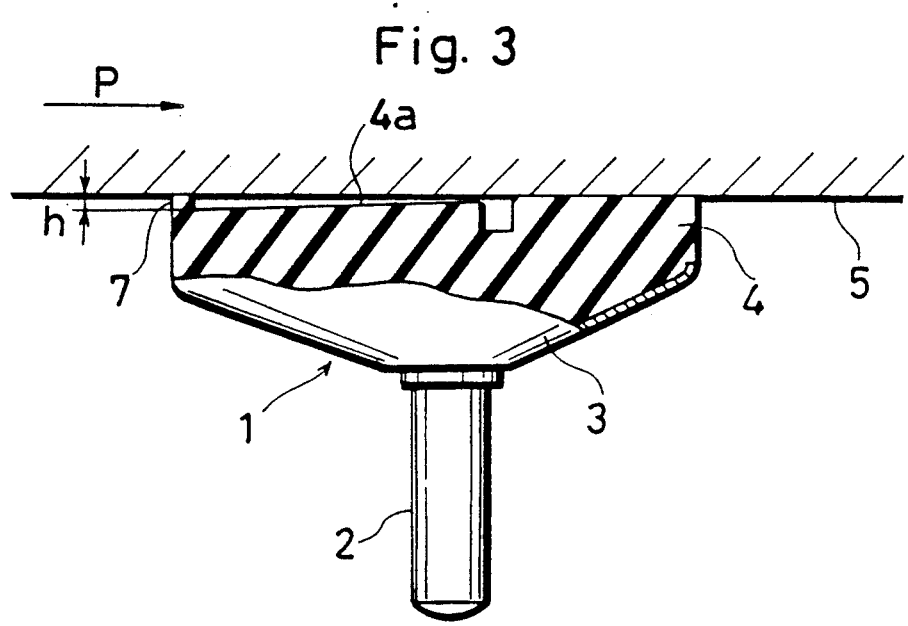
FIG. 3 is a view partly in section for illustrating the embodiment of FIG. 1.

As shown in FIGS. 1 to 3, a brake shoe 1 of the present invention comprises a shoe holder 3, a shoe block 4 fittingly held at its base portion to the shoe holder 3, and a connecting rod 2 projecting from the back of the shoe holder 3. This construction is the same as the construction of common brake shoes.

The shoe block 4 is prepared by molding a material selected from among rubber and rubberlike materials having suitable elasticity. The shoe block 4 has a braking face 4a adapted for surface-to-surface contact with a wheel rim. As will be apparent from FIG. 2, the braking face 4a has a width corresponding to that of the rim and a length in the front-to-rear direction for giving a required area of contact with the rim. The braking face 4a is, for example, planar when the rim surface is planar or curved inward in cross section if the rim surface is bulged in cross section so as to come into surface-to-surface contact with the rim.

The braking face 4a may be formed with a drain groove 6 for drawing off the water wetting the face 4a and the rim surface in the rain.

According to the present invention, the braking face 4a of the shoe block 4 is integrally formed with a small projection 7. With the embodiment of FIGS. 1 to 3, the projection 7 is positioned rearwardly of the face 4a so as to project in the form of a circular arc. The projection 7 can be formed integrally with the shoe block 4 simultaneously when the block is molded.

When the brake shoe 1 is to be attached to a brake arm, the projection 7 must be positioned rearward opposite to the forward direction in which the rim 5 rotates. According to the illustrated embodiment, the shoe block 4 is provided on a side face thereof with an arrow mark 8 indicating the direction of rotation of the rim 5 so as to orient the brake shoe correctly. The mark 8, which can be printed, may be formed as a protrusion or recess simultaneously when the shoe block 4 is molded. The mark 8, which is provided on the shoe block 4, may alternatively be formed on the shoe holder 3.

The brake shoe 1 is attached to the brake arm in the following manner.

The brake shoe 1 is fixed to the brake arm usually by connecting the rod 2 to the brake arm with use of threaded means. When the brake shoe 1 of the present invention is to be installed, the shoe block 4 is held by hand so that two points thereof, i.e., one point of the braking face 4a and the projection 7, are in contact with the rim surface 5, with the threaded means loosened, as seen in FIG. 3, and the threaded means is tightened up in this state. When the projection 7 and one point of the braking face 4a are in contact with the rim, the braking face 4a is so inclined as to be at a smaller distance from the rim surface at its forward portion than at its rearward portion because the projection 7 is positioned toward the rear end of the braking face 4a. The inclination is determined by the height h of the projection 7. More specifically, the designer determines the height h of the projection 7 so that the braking face will be at such an angle of inclination with the rim surface as to permit the brake to operate most efficiently when the brake shoe is installed by the foregoing method.

Accordingly, when the brake shoe 1 of the present invention is installed in place by the above method, the angle of inclination of the braking face 4a with respect to the rim surface is readily adjustable as contemplated by the designer.

If the braking face 4a is thus optimally inclined relative to the rim surface, the braking face 4a will come into contact with the rim surface uniformly over the entire area of the face 4a to brake the rim efficiently when the brake is actuated with the brake arm deflected owing to the frictional force applied thereto by the rim surface. Since the projection 7 is small and serves merely as a gauge for adjusting the position of the braking face 4a, the projection is readily collapsed by the great pressure given to the rim surface upon braking without producing any adverse effect on the braking function. After the brake shoe 1 has been installed, the projection 7 is removed early by the frictional contact thereof with the rim 5. More specifically, the brake shoe 1 of the present invention has the projection 7 which serves as a gauge when the shoe is to be installed, whereas the projection is automatically removed after serving as the gauge, whereby the brake shoe is made to have the same appearance as common brake shoes.

Figure 4:
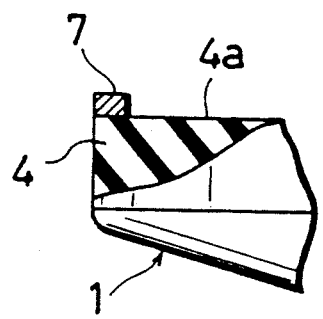
FIGS. 4, 5 and 6 are fragmentary views partly in section showing other embodiments of the invention.

Although the projection 7 is formed integrally with the shoe block 4 simultaneously when the block is molded according to the foregoing embodiment, a separate rubber piece may be attached to a suitable portion of the braking face 4a of the shoe block 4, for example, by adhesion as seen in FIG. 4.

Figure 5:
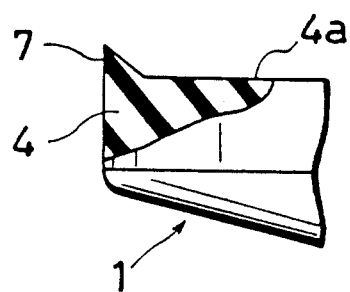
Figure 6:
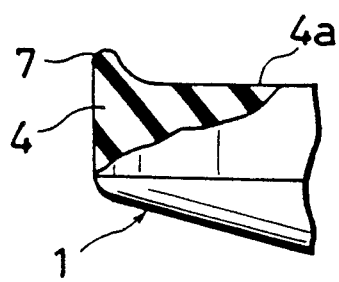
Figure 7:
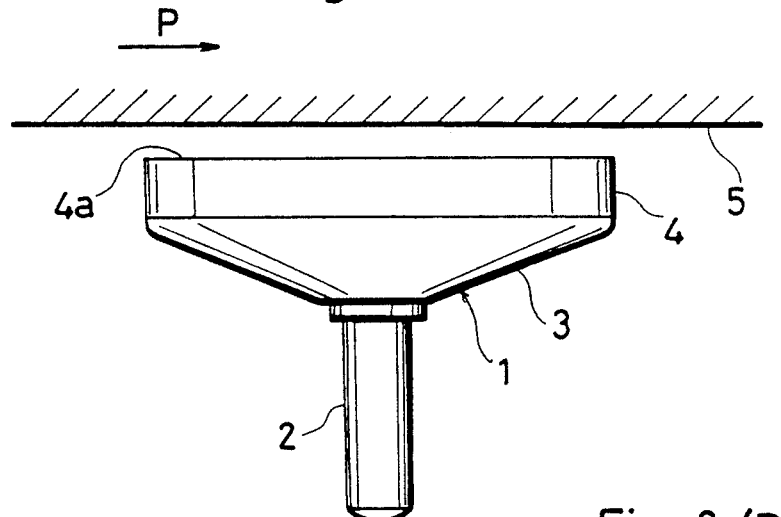
FIGS. 7, 8 and 9 are views illustrating a conventional example.
Figure 8:
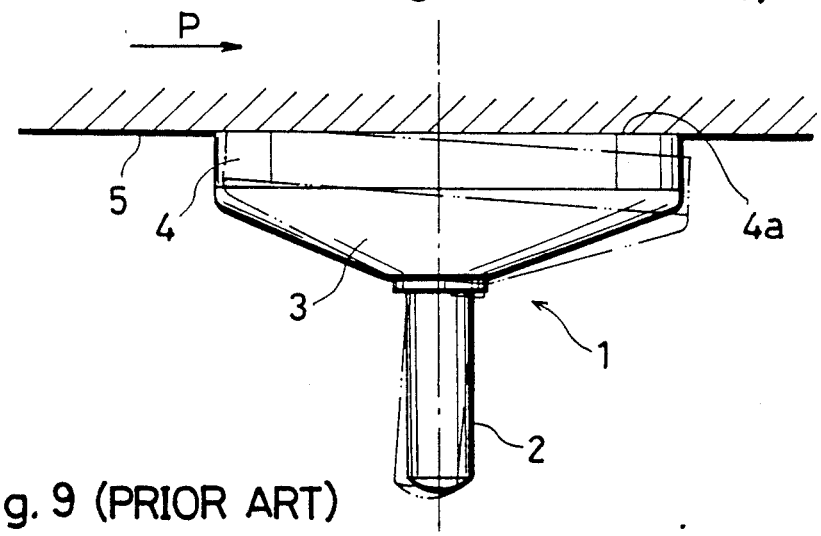
Figure 9:
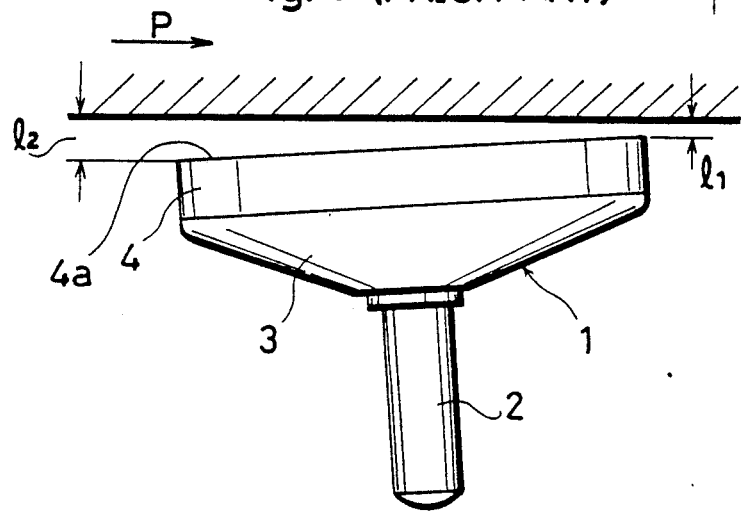

Furthermore, the projection 7 is not limited in configuration. For example, the projection may be tapered upward in the form of a ridge as shown in FIG. 5 or 6. The projection is then more readily collapsible and deformable on braking and becomes less likely to affect the braking function.

The brake shoe of the present invention is of course usable for both the so-called caliper brake and the so-called cantilever brake.

Furthermore, various modifications or alterations based on the principle set forth in the appended claims are all included within the scope of the claims.

What is claimed is:

1. A bicycle brake shoe for attachment to a brake arm, the brake shoe being pressed against a wheel rim for braking, the brake shoe comprising:

a shoe holder; and a shoe block held by the shoe holder, the shoe block having a braking face which comes into surface-to-surface contact with the wheel rim at the time of braking, the braking face having a leading edge and a trailing edge, the leading edge being located ahead of the trailing edge with respect to forward rotation of the wheel;

wherein the braking face of the shoe block is provided with a projection means at a position offset toward the trailing edge, the projection means providing a first contact point while a portion of the braking face offset toward the leading edge provides a second contact point, whereby the projection means serves as a gauge for positioning the braking face at an appropriate inclination angle with respect to the wheel rim surface at the time of attaching the brake shoe to the brake arm, the projection means being collapsible at the time of braking.

2. The brake shoe according to claim 1, wherein the projection means is located generally at the trailing edge of the braking face.

3. The brake shoe according to claim 1, wherein the projection means is formed integrally with the shoe block simultaneously when the shoe block is molded.

4. The brake shoe according to claim 11, wherein the projection means is formed by adhering a separate member to the braking face.

5. The brake shoe according to claim 1, wherein one of the shoe block and the shoe holder is provided with a mark indicating the rotational direction of the wheel.

* * * * *